(12) United States Patent
Yoshii

(10) Patent No.: US 10,594,675 B2
(45) Date of Patent: Mar. 17, 2020

(54) COMMUNICATION APPARATUS, COMMUNICATION SYSTEM, COMMUNICATION METHOD, AND PROGRAM

(71) Applicant: HONDA MOTOR CO., LTD, Minato-ku, Tokyo (JP)

(72) Inventor: Yu Yoshii, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 15/806,457

(22) Filed: Nov. 8, 2017

(65) Prior Publication Data
US 2018/0139196 A1   May 17, 2018

(30) Foreign Application Priority Data

Nov. 11, 2016   (JP) .................. 2016-220647

(51) Int. Cl.
G06F 21/44    (2013.01)
H04L 29/06    (2006.01)
H04L 9/32     (2006.01)

(52) U.S. Cl.
CPC .............. H04L 63/08 (2013.01); G06F 21/44 (2013.01); H04L 9/3271 (2013.01); H04L 63/083 (2013.01)

(58) Field of Classification Search
CPC ... H04L 9/0869; H04L 9/3271; H04L 9/3273; H04L 63/08; H04W 12/06
See application file for complete search history.

(56) References Cited

U.S. PATENT DOCUMENTS

| 2004/0015554 | A1  | 1/2004 | Wilson |
| 2007/0028088 | A1* | 2/2007 | Bayrak ............... H04L 63/0428 713/150 |
| 2007/0037602 | A1* | 2/2007 | Shimizu ............... H04L 1/0001 455/550.1 |
| 2008/0211901 | A1* | 9/2008 | Civanlar ............... H04N 7/152 348/14.09 |

(Continued)

FOREIGN PATENT DOCUMENTS

| JP | 2000-261496 | 9/2000 |
| JP | 2012-060366 | 3/2012 |

(Continued)

OTHER PUBLICATIONS

Japanese Office Action for Japanese Patent Application No. 2016-220647 dated Jul. 24, 2018.

*Primary Examiner* — Lisa C Lewis
*Assistant Examiner* — Zhimei Zhu
(74) *Attorney, Agent, or Firm* — Amin, Turocy & Watson, LLP

(57) ABSTRACT

A communication apparatus that transmits a challenge code on the basis of a received request signal and performs authentication of an authentication target apparatus transmitting the request signal on the basis of the challenge code and a response code generated on the basis of the challenge code includes a control unit configured to perform a predetermined fail-safe process when a request signal is received a set number of times or more from the authentication target apparatus before completion of the authentication after the transmission of the challenge code.

9 Claims, 15 Drawing Sheets

(56) References Cited

U.S. PATENT DOCUMENTS

| | | | | |
|---|---|---|---|---|
| 2008/0318552 | A1* | 12/2008 | Harms | H04W 12/06 455/411 |
| 2009/0310493 | A1* | 12/2009 | Nogami | H04L 1/205 370/252 |
| 2012/0242459 | A1* | 9/2012 | Lambert | H04L 9/3271 340/10.3 |
| 2012/0272067 | A1* | 10/2012 | Jaquet-Chiffelle | G06F 21/34 713/183 |
| 2014/0068098 | A1* | 3/2014 | Anchan | H04W 12/06 709/235 |
| 2014/0293780 | A1* | 10/2014 | Faccin | H04W 28/02 370/230 |
| 2015/0131435 | A1* | 5/2015 | Kasslin | H04W 84/12 370/230 |
| 2016/0218984 | A1* | 7/2016 | Nishikawa | H04L 1/1887 |
| 2016/0360155 | A1* | 12/2016 | Civanlar | H04N 7/152 |
| 2017/0339598 | A1* | 11/2017 | Yamamoto | H04M 11/00 |
| 2018/0183612 | A1* | 6/2018 | Yoshii | H04L 9/3271 |

FOREIGN PATENT DOCUMENTS

| | | |
|---|---|---|
| JP | 2015-063875 | 4/2015 |
| JP | 2016-000549 | 1/2016 |

* cited by examiner

COMMUNICATION APPARATUS, COMMUNICATION SYSTEM, COMMUNICATION METHOD, AND PROGRAM

CROSS-REFERENCE TO RELATED APPLICATION

Priority is claimed on Japanese Patent Application No. 2016-220647, filed Nov. 11, 2016, the content of which is incorporated herein by reference.

BACKGROUND OF THE INVENTION

Field of the Invention

The present invention relates to a communication apparatus, a communication system, a communication method, and a program.

Description of Related Art

Conventionally, communication systems performing authentication of communication apparatuses are known. Among such communication systems, there are communication systems each performing an authentication process using a challenge code and a response code generated on the basis of the challenge code. For example, a first communication apparatus transmits a request signal to a second communication apparatus. The second communication apparatus transmits a challenge code on the basis of the request signal. The first communication apparatus generates a response code on the basis of the challenge code and transmits the response code to the second communication apparatus. The second communication apparatus performs an authentication process for the first communication apparatus (authentication target apparatus) that has transmitted the request signal described above on the basis of the challenge code and the response code generated on the basis of the challenge code.

In a network through which the first communication apparatus and the second communication apparatus communicate with each other, a behavior of a disguised communication apparatus other than both the first communication apparatus and the second communication apparatus repeatedly transmitting a disguised request signal to the network, waiting for a challenge code, and acquiring the regularity and the like of the challenge code is known (for example, see Japanese Unexamined Patent Application, First Publication No. 2015-063875).

SUMMARY OF THE INVENTION

However, the disguised communication apparatus can acquire the regularity of challenge codes by repeatedly transmitting a request signal. Alternatively, in a case where a disguised communication apparatus has a response signal for a specific challenge code, by repeating the transmission of a request code until the reception of the specific challenge code, a response code corresponding to the specific challenge code can be transmitted. In the case as described above, the reliability of authentication is may be degraded.

An aspect relating to the present invention is made in consideration of such situations, and one object thereof is to provide a communication apparatus, a communication system, a communication method, and a program capable of further improving the reliability of authentication using communication.

In order to solve the problems described above, the present invention employs the following aspects.

(1) A communication apparatus according to one aspect of the present invention is a communication apparatus that transmits a challenge code on the basis of a received request signal and performs authentication of an authentication target apparatus transmitting the request signal on the basis of the challenge code and a response code generated on the basis of the challenge code and includes a control unit configured to perform a predetermined fail-safe process when a request signal is received a set number of times or more from the authentication target apparatus before completion of the authentication after the transmission of the challenge code.

(2) In the aspect (1) described above, the completion of the authentication may be reception of the response code, and the control unit may be configured to perform the predetermined fail-safe process when a request signal is received the set number of times or more from the authentication target apparatus before the reception of the response code.

(3) In the aspect (1) or (2) described above, the control unit may be configured to perform a challenge code transmission prohibiting process of not transmitting the challenge code for the request signal received from the authentication target apparatus as the predetermined fail-safe process.

(4) In any one of the aspects (1) to (3) described above, the control unit, by performing the predetermined fail-safe process, may set a value of the challenge code to a value of a challenge code transmitted before the predetermined fail-safe process is performed.

(5) In any one of the aspects (1) to (4) described above, the control unit may set the same value as a value of a challenge code transmitted immediately before the predetermined fail-safe process is performed as a value of the challenge code.

(6) In any one of the aspects (1) to (5) described above, the control unit may change a value of the set number of times in accordance with a communication state.

(7) In the aspect (6) described above, a radio communication unit configured to perform radio communication with the authentication target apparatus may be further included, and, when a reception signal intensity of the radio communication is weaker than a predetermined value, the control unit may set a value of the set number of times to a value larger than a value of a case in which the reception signal intensity is stronger than the predetermined value.

(8) In the aspect (6) or (7) described above, in a communication line communicating with the authentication target apparatus, when an amount of communication per unit time is larger than a predetermined value, the control unit may set the value of the set number of times to a value larger than a value of a case in which the amount of communication is less than the predetermined value.

(9) A communication system according to one aspect of the present invention includes: a first communication apparatus according to any one of the aspects (1) to (8) described above; and a second communication apparatus configured to transmit a request signal, receive a challenge code after the transmission of the request signal, generate a response code on the basis of the challenge code, and transmit the generated response code to the first communication apparatus.

(10) According to one aspect of the present invention, a communication method using a communication apparatus that transmits a challenge code on the basis of a received request signal and performs authentication of an authentication target apparatus transmitting the request signal on the basis of the challenge code and a response code generated on the basis of the challenge code includes: counting a number of times a request signal is received from the authentication target apparatus before completion of the authentication after the transmission of the challenge code; and performing a predetermined fail-safe process when the number of times the request signal is received is a set number of times or more based on a result of the counting.

(11) According to one aspect of the present invention, a program causes a computer of a communication apparatus that transmits a challenge code on the basis of a received request signal and performs authentication of an authentication target apparatus transmitting the request signal on the basis of the challenge code and a response code generated on the basis of the challenge code to execute: counting a number of times a request signal is received from the authentication target apparatus before completion of the authentication after the transmission of the challenge code; and performing a predetermined fail-safe process when the number of times the request signal is received is a set number of times or more based on a result of the counting.

According to an aspect of the present invention, there is provided a communication apparatus that transmits a challenge code on the basis of a received request signal and performs authentication of an authentication target apparatus transmitting the request signal on the basis of the challenge code and a response code generated on the basis of the challenge code and includes a control unit configured to perform a predetermined fail-safe process in a case where a request signal is received a set number of times or more from the authentication target apparatus before completion of the authentication after the transmission of the challenge code, whereby a communication apparatus, a communication system, a communication method, and a program capable of improving the reliability of authentication through communication can be provided.

BRIEF DESCRIPTION OF THE DRAWINGS

FIG. 7 is a diagram illustrating an example of an attack of an external apparatus 50S on an ECU or the like.

DETAILED DESCRIPTION OF THE INVENTION

Hereinafter, a communication apparatus, a communication system, a communication method, and a program according to embodiments of the present invention will be described with reference to the drawings.

First Embodiment

Figure 1:
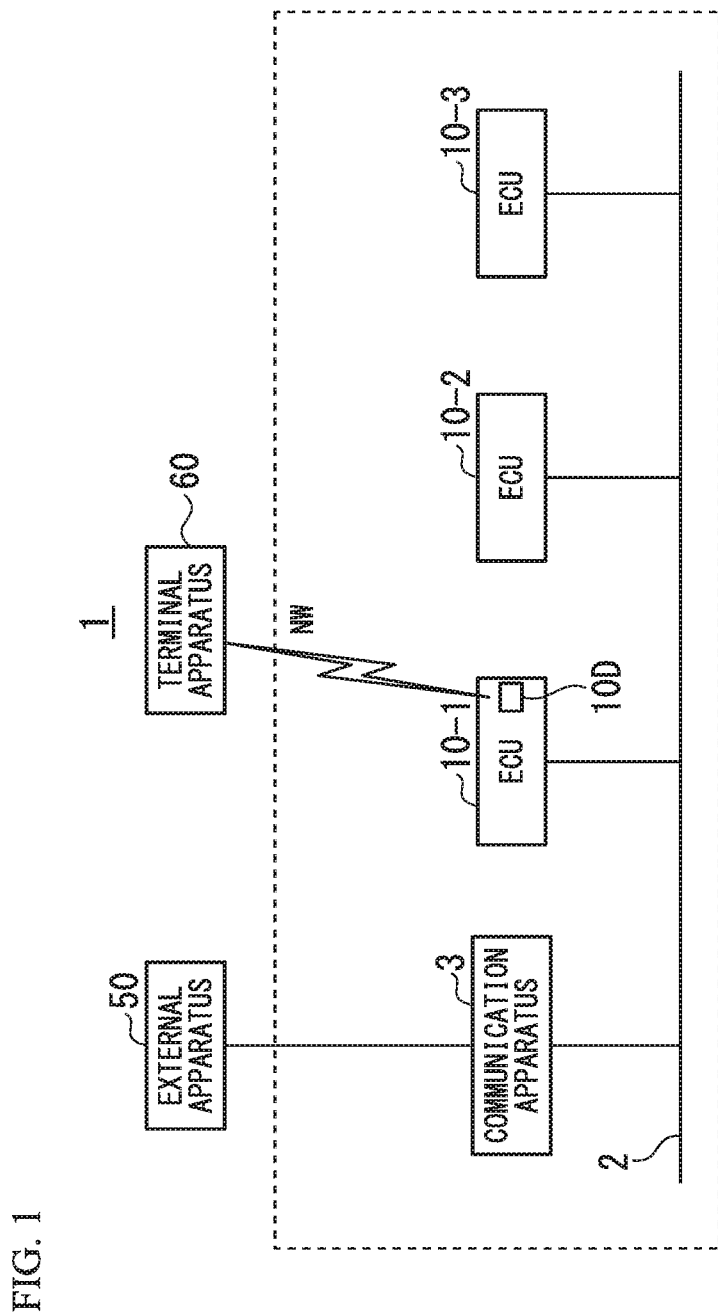
FIG. 1 is a diagram illustrating the configuration of a communication system 1 according to a first embodiment.

FIG. 1 is a diagram illustrating the configuration of a communication system 1 according to this embodiment. The communication system 1, for example, is mounted in a vehicle. The communication system 1 configures a network NW at least inside the vehicle. In the network NW, for example, communication on the basis of a communication system such as a controller area network (CAN) or IEEE 802.3 is performed through a bus 2.

The communication system 1 includes ECUs 10-1 to 10-3 connected to the bust 2.

Hereinafter, in a case where the ECUs 10-1 to 10-3 do not need to be discriminated from each other, each thereof will be simply referred to as an ECU 10. Although devices such as the ECUs 10-1 to 10-3 are described as being connected to the common bus 2, the devices may be connected to other buses connected to communicate with each other through a relay device not illustrated in the drawing or the like.

The ECU 10, for example, is an engine ECU controlling an engine, a seat belt ECU controlling a seat belt, or the like. The ECU 10 receives a frame transmitted to the network NW to which the own apparatus belongs. Hereinafter, each frame transmitted to the network NW will be referred to as a frame F. The frame F is identified using an identifier (hereinafter, referred to as an ID) attached thereto. The ECU 10 stores an ID (hereinafter, referred to as a registration ID) used for identifying a frame F relating to the ECU 10 in a storage unit 12 (FIG. 2B). When a frame F is received, by referring to an ID (hereinafter, referred to as a reception ID) attached to the received frame, the ECU 10 extracts and acquires a frame F to which the reception ID having the same value as the registration ID is attached. The ECU 10 performs an authentication process of a communication partner at the time of performing communication.

In the network NW, a communication apparatus 3 in which a DLC that is a terminal used for a connection with an external apparatus 50 such as a verification apparatus is arranged is disposed. A verification apparatus or the like connected to the communication apparatus 3 at the time of performing maintenance of a vehicle or the like is an example of the external apparatus 50. The verification apparatus tests and verifies the state of the communication system 1 by communicating with the ECU 10 connected to the bus 2. Except at the time of maintenance of a vehicle or the like, the communication system 1 can function without connecting a verification apparatus or the like to the communication apparatus 3.

Figure 2A:
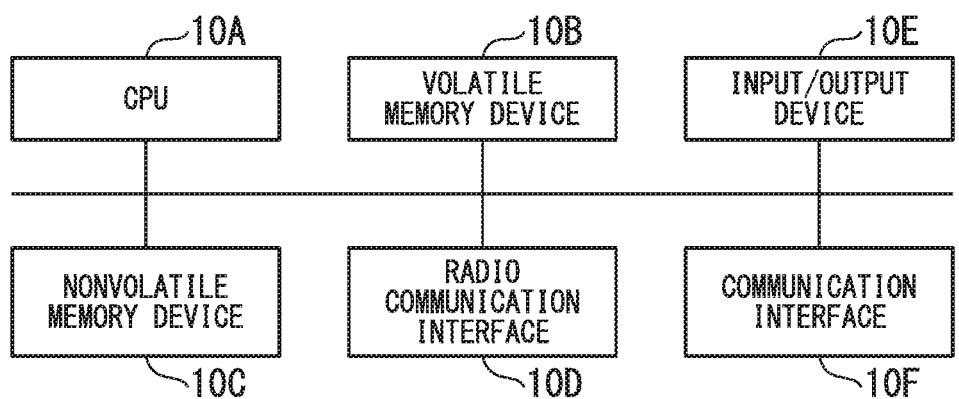
FIG. 2A is a diagram illustrating the hardware configuration of an ECU 10 according to this embodiment.
Figure 2B:
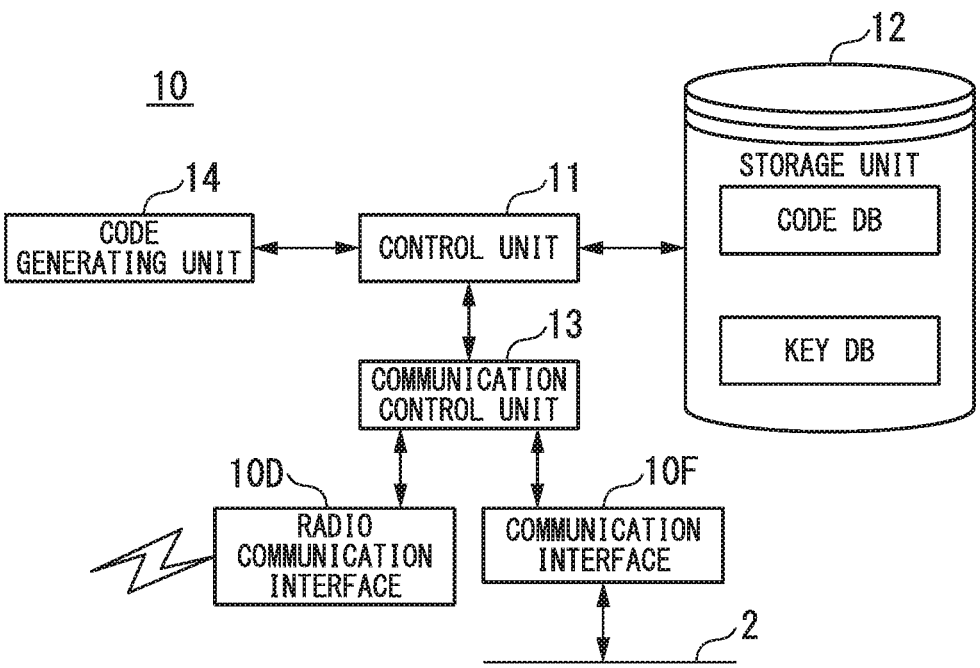
FIG. 2B is a diagram illustrating the functional configuration of the ECU 10 according to this embodiment.

FIG. 2A is a diagram illustrating the hardware configuration of the ECU 10 according to this embodiment. The ECU 10 is a computer including: a CPU 10A; a nonvolatile memory device 10C such as a read only memory (ROM), an electrically erasable and programmable read only memory (EEPROM), or a hard disk drive (HDD); a volatile memory device 10B such as a random access memory (RAM) or a register; a radio communication interface 10D; an input/output device 10E; a communication interface 10F, and the like. There are cases where the ECU 10 does not include one or both the radio communication interface 10D and the input/output device 10E in accordance with the type, the use, or the like.

FIG. 2B is a diagram illustrating the functional configuration of the ECU 10 according to this embodiment. The ECU 10 includes: a control unit 11; a storage unit 12: a communication control unit 13; and a code generating unit 14. For example, the control unit 11, the communication control unit 13, and the code generating unit 14 are realized by a processor such as the CPU 10A executing a program.

The control unit 11 controls units including the communication control unit 13 and the code generating unit 14. For example, the control unit 11 receives a communication request from the external apparatus 50 or the like and performs an authentication process of the external apparatus 50 or the like in accordance with the communication request from the external apparatus 50 or the like. Hereinafter, description will be presented with the authentication process performed by the control unit 11 focused on.

The storage unit 12 is realized by the nonvolatile memory device 10C and the volatile memory device 10B. The storage unit 12 stores programs such as an application program and a communication control program and various kinds of information referred to in accordance with the execution of the programs. Various information described above is generated by the code generating unit 14 and includes a challenge code (hereinafter, referred to as a seed), a response code (hereinafter, referred to as a KEY1) on the basis of the seed described above, and the like. The seed is added to a code DB and is stored in the storage unit 12 as the code DB. The KEY1 is stored in the storage unit 12 as a key DB that can be referred to by using the value of the SEED as a key.

The communication control unit 13 controls communication with an external apparatus through the communication interface 10F. The communication interface 10F is an interface used for connecting the ECU 10 to the bus 2.

The communication control unit 13 controls the communication interface 10F, whereby communication with other apparatuses requested by the control unit 11 is enabled. The communication control unit 13 receives a notification from the communication interface 10F and notifies the control unit 11 of a communication request from any other apparatus. According to the authentication process or the like performed by the control unit 11, it is determined whether or not a communication request from any other apparatus is accepted.

The code generating unit 14 generates a seed. For example, the code generating unit 14 generates a seed as a random number generated each time when the authentication process is performed. Alternatively, the code generating unit 14 may generate a seed having a value corresponding to the number of times an authentication process is performed. At this time, the code generating unit 14 may generate a seed by determining the value of the seed as a result of an arithmetic operation on the basis of the number of performed authentication processes and may generate a seed by determining the value of the seed by referring to a table of which values are determined in advance by using the number of performed authentication processes as the key.

Figure 3:
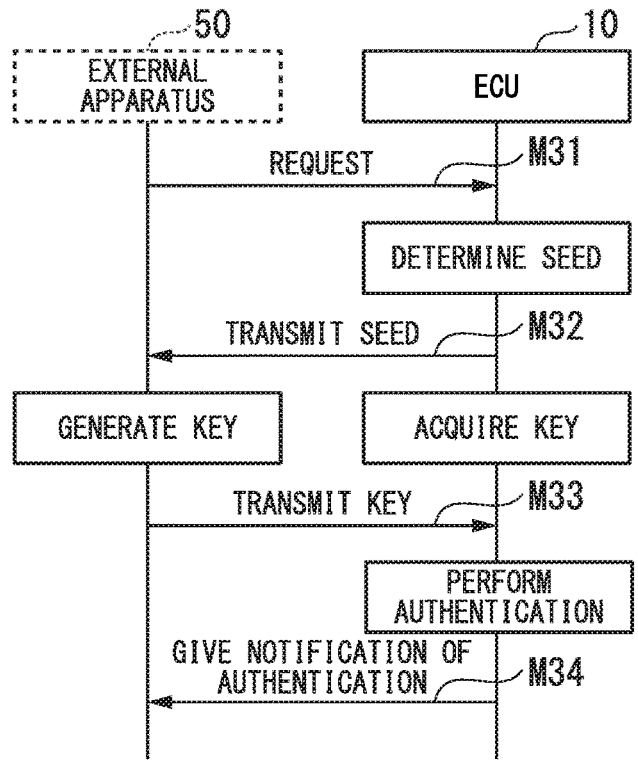
FIG. 3 is a diagram illustrating a typical communication sequence according to this embodiment.

FIG. 3 is a diagram illustrating a typical communication sequence according to this embodiment. The ECU 10 limits the communication partner by performing the authentication process of the communication partner. The communication sequence illustrated in the drawing illustrates a typical example relating to the authentication process of the communication partner.

For example, the external apparatus 50 (the authentication target apparatus) transmits a seed request. The ECU 10 receives the seed request (M31).

The ECU 10 (control unit 11) generates a seed on the basis of the received seed request by using the code generating unit 14 and transmits the generated seed (M32). For example, the ECU 10 (control unit 11) acquires a KEY1 corresponding to the seed from the key DB of the storage unit 12. Instead of the description presented above, the control unit 11 may calculate the KEY1 on the basis of a predetermined arithmetic operation equation.

The external apparatus 50 receives a seed and generates and transmits a response code (hereinafter, referred to as a KEY2) on the basis of the seed. The ECU 10 (control unit 11) receives the KEY2 transmitted by the external apparatus 50 (M33).

The ECU 10 (control unit 11) performs an authentication process on the basis of the KEY1 corresponding to the seed and the received KEY2 and gives a notification of a result thereof (M34).

A typical example of the authentication process of the communication partner has been described as above. In description presented below, in a case where the KEY1 and the KEY2 are to be collectively represented without being discriminated from each other, each thereof may be simply referred to as a KEY.

Figure 4:
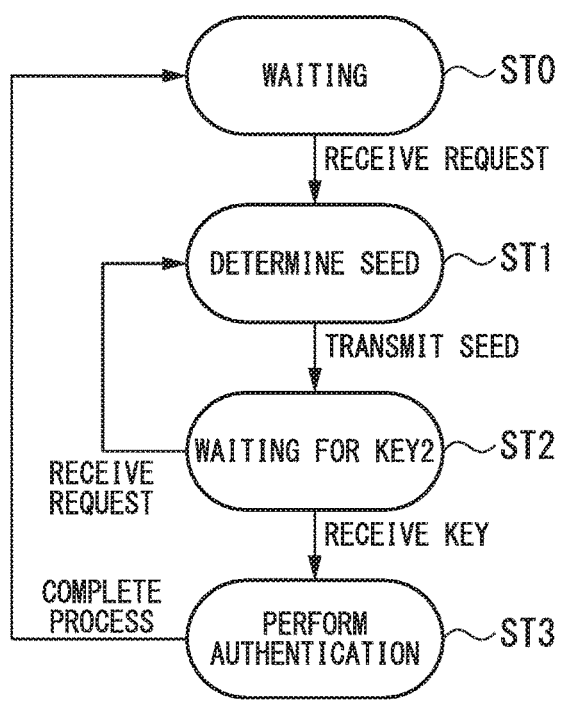
FIG. 4 is a state transition diagram of an authentication process performed by the ECU 10 according to this embodiment.

FIG. 4 is a state transition diagram of an authentication process performed by the ECU 10 according to this embodiment.

In a waiting state (ST0: waiting) in which communication is not performed, as a seed request (reception of a request) is received, the control unit 11 transitions the control state to a state (hereinafter referred to as a seed determination process state) in which the process of determining the value of the seed is performed (ST1: seed determination).

In the seed determination process state (ST1), as the generated seed is transmitted, the control unit 11 transitions the control state to a KEY2 reception waiting state (ST2: KEY2 waiting).

In the KEY2 reception waiting state (ST2: KEY2 waiting), when a KEY2 is received (KEY reception), the control unit 11 transitions the state to a control state (ST3: authentication) in which an authentication process is performed.

When the authentication process is completed (process completion), the control unit 11 transitions the control state to a waiting state (ST0).

In addition, in the KEY2 reception waiting state (ST2: KEY2 waiting), when a seed request is received (request reception), the control unit 11 transitions the control state to the seed determination process state (ST1: seed determination).

Figure 5:
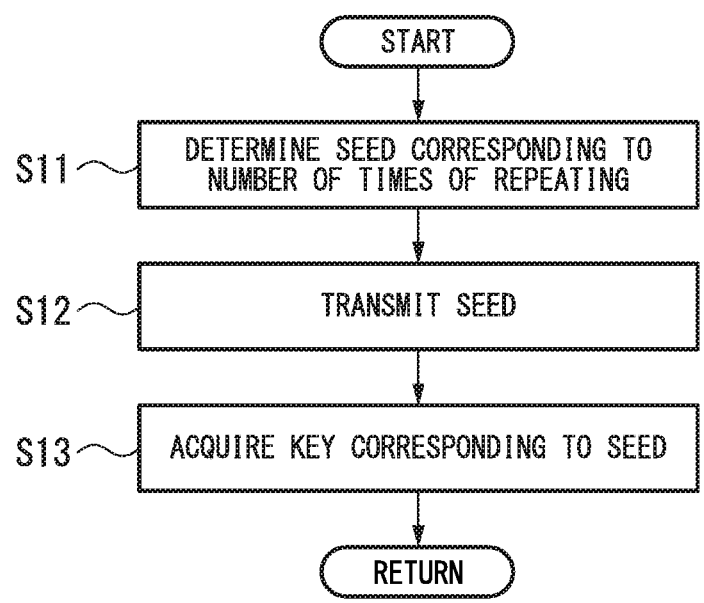
FIG. 5 is a flowchart illustrating the sequence of a seed generating process performed by the ECU 10 according to this embodiment.

FIG. 5 is a flowchart illustrating the sequence of a seed generating process performed by the ECU 10 according to this embodiment. In the example described below, although a seed will be described as a value determined according to the number of repetitions of the authentication process by the code generating unit 14, the seed may be a random number that is randomly generated not on the basis of the number of repetitions of the authentication process. The control unit 11 performs the following process by being triggered upon the reception of a seed request. The control unit 11 determines the value of the seed according to the number k of repetitions of the authentication process to be a value determined by the code generating unit 14 (S11). The control unit 11 transmits the determined seed (S12) and adds the determined seed to the code DB. The control unit 11 calculates a KEY1 corresponding to the determined seed on the basis of an arithmetic operation equation stored in the storage unit 12 (S13). For example, according to the sequence described above, the control unit 11 acquires a seed and a KEY1 corresponding to the seed.

Figure 6:
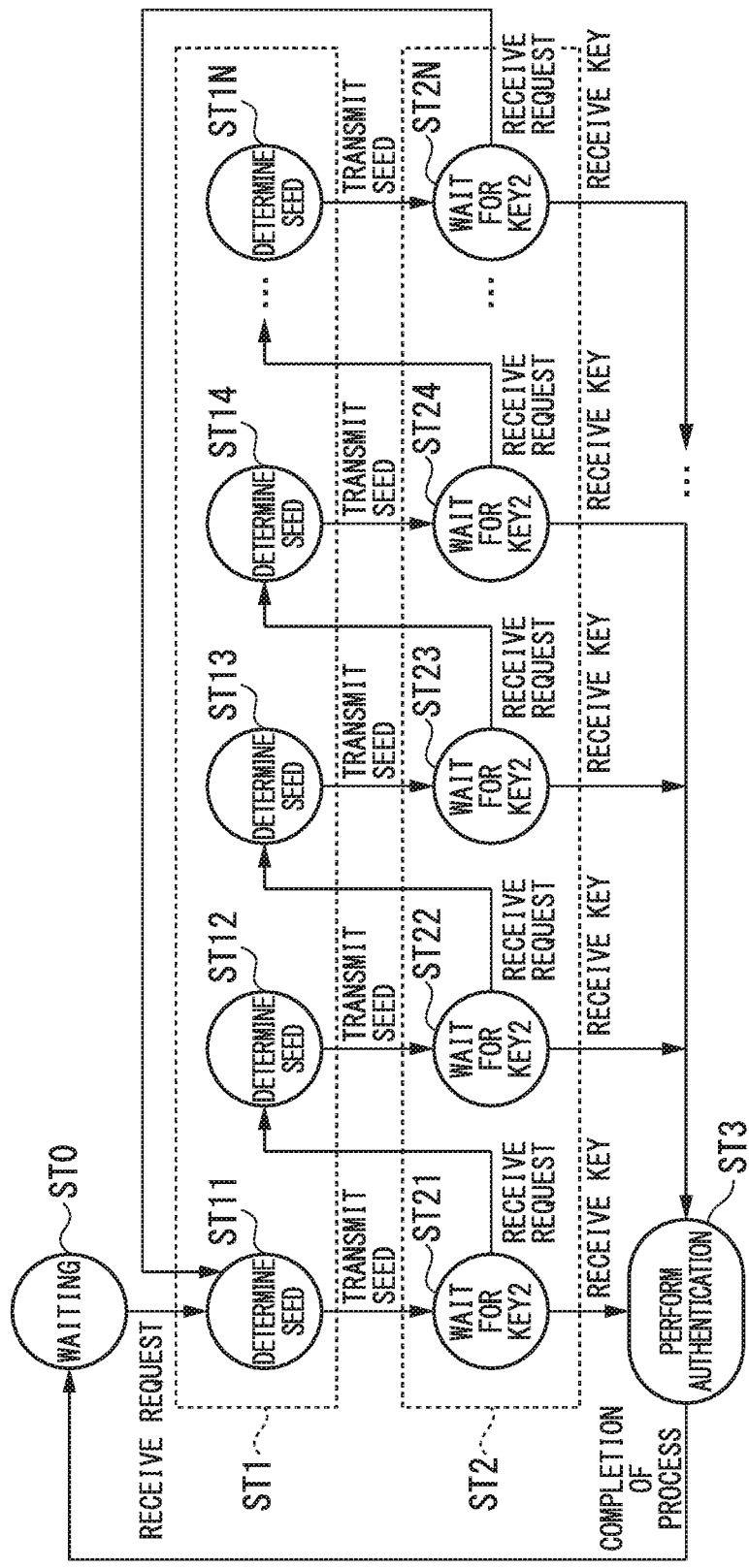
FIG. 6 is a diagram illustrating a more detailed example of the sequence of the authentication process according to this embodiment illustrated in FIG. 4.

FIG. 6 is a diagram illustrating a more detailed example of the authentication process state transitions illustrated in FIG. 4. Description will focus on different points from FIG. 4.

The control unit 11 does not continuously transmit a seed having the same value as the transmitted seed. For example, even when the state is returned from the KEY2 reception waiting state (ST2) to the seed determination process state (ST1), the control unit 11 does not transmit a seed having the same value as a seed that was transmitted immediately before.

For example, as illustrated in FIG. 6, as KEY2 reception waiting states (ST2), N (here, N represents a natural number) states from ST21 to ST2N are defined. The control unit 11 sets all the values of seeds determined in the states from ST11 to ST1N to be different from each other.

In the seed determination process state of ST11, by transmitting a seed (for example, seed #1), the control unit 11 transitions the control state to the KEY2 reception waiting state (ST21: KEY2 waiting).

Next, in the state of ST21, by receiving a seed request (request reception), the control unit 11 transitions the control state to the seed determination process state (ST12: seed determination).

In the seed determination process state of ST12, the control unit 11 transmits a seed (for example, seed #2). Hereinafter, this similarly applies.

In addition, in the state of ST2N, by receiving a seed request (request reception), the control unit 11 transitions the control state to the seed determination process state (ST11: seed determination). When the seed is generated as a random number, the adjustment of the value of the seed according to the transition described above is not necessary, and the generation of a random number may be similarly continued until ST2N.

In addition, in the KEY2 reception waiting state of ST21 to ST2N, by receiving the KEY2 (KEY reception), the control unit 11 transitions the state to a control state (ST3: authentication) in which an authentication process is performed on the basis of the KEY1 associated from the seed of each state and the KEY2 corresponding to the seed.

However, there are cases in which an apparatus or the like (hereinafter referred to as an external apparatus 50S) pretending to be the external apparatus 50 attempts to acquire information of a KEY corresponding to a seed for the purpose of clearing the authentication process performed by the ECU 10 (obtains authentication of a regular apparatus from the ECU 10) by using an illegitimate method. For example, an example of the external apparatus 50 includes a diagnostic device of the ECU 10.

The external apparatus 50S described above includes a diagnostic device of the ECU 10 that is illegitimately altered, a device pretending to be a diagnostic device, and the like.

Figure 7:
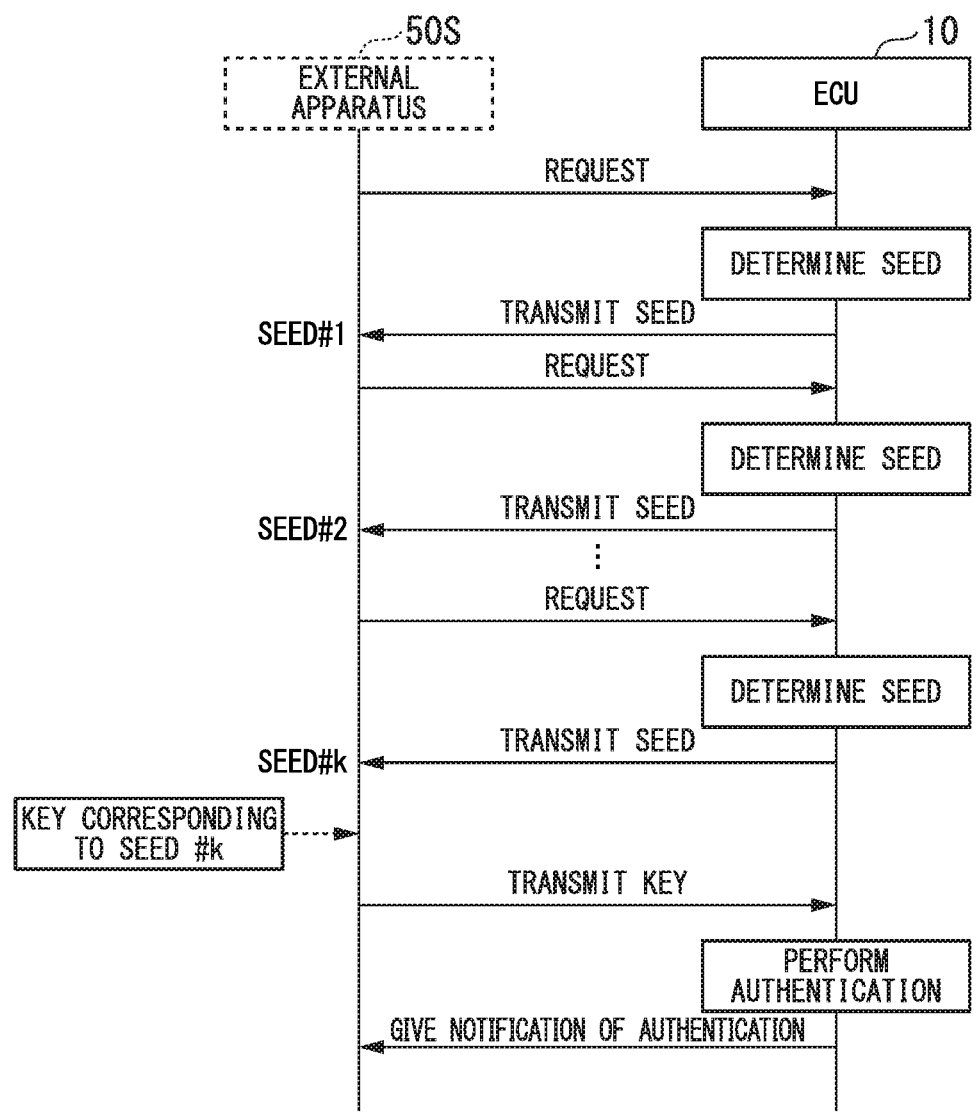

FIG. 7 is a diagram illustrating an example of an attack of the external apparatus 50S on an ECU or the like. There are cases in which the external apparatus 50S attacks the ECU 10 or the like as illustrated in the drawing for acquiring information on the regularity of the seed and the KEY.

The external apparatus 50S repeatedly transmits a seed request. An ECU of a comparative example receives a seed request, calculates a seed each time of reception of a seed request, and returns the calculated seed to the external apparatus 50S. The ECU of the comparative example cannot identify whether the seed request is a legitimate seed request or a seed request according to an attacking sequence and sequentially transmits determined seeds in accordance with the reception of a seed request.

For example, seeds having different values such as seed #1, seed #2, . . . , seed # k are transmitted. The external apparatus 50S finds the regularity and the like of the values of the seeds of the ECU of the comparative example from the values of such seeds and accumulates findings for clearing the authentication process of the ECU.

In this case, there is concern that the external apparatus 50S can calculate a KEY from an arbitrary seed received from the ECU of the comparative example through an analysis on the basis of the findings described above.

In addition, there are cases in which, even if a KEY cannot be calculated from a received arbitrary seed, the external apparatus 50S has a combination of a specific seed and a key that can be used for obtaining authentication by wiretapping the communication of a regular diagnostic device. In such cases, when the external apparatus 50S repeats the transmission of a seed request and thus receives a seed relating to the specific combination held thereby, there is concern of an illegitimate process of obtaining authentication by transmitting a KEY corresponding to the seed to the ECU or the like being performed.

In the ECU of the comparative example or the like, even when the number of times until the value of the seed circulates once as illustrated in FIG. 6 described above is formed to be large, if the external apparatus 50S mechanically performs the process illustrated in FIG. 7, the effectiveness may be lowered. In addition, even when the value of a seed is generated as a complete random number not depending on the number of authentication processes performed, as described above, if a seed relating to a specific combination is received, it can be assumed that the effectiveness of authentication is lowered according to an illegitimate process of obtaining authentication by responding with a KEY corresponding to the seed.

Figure 8A:
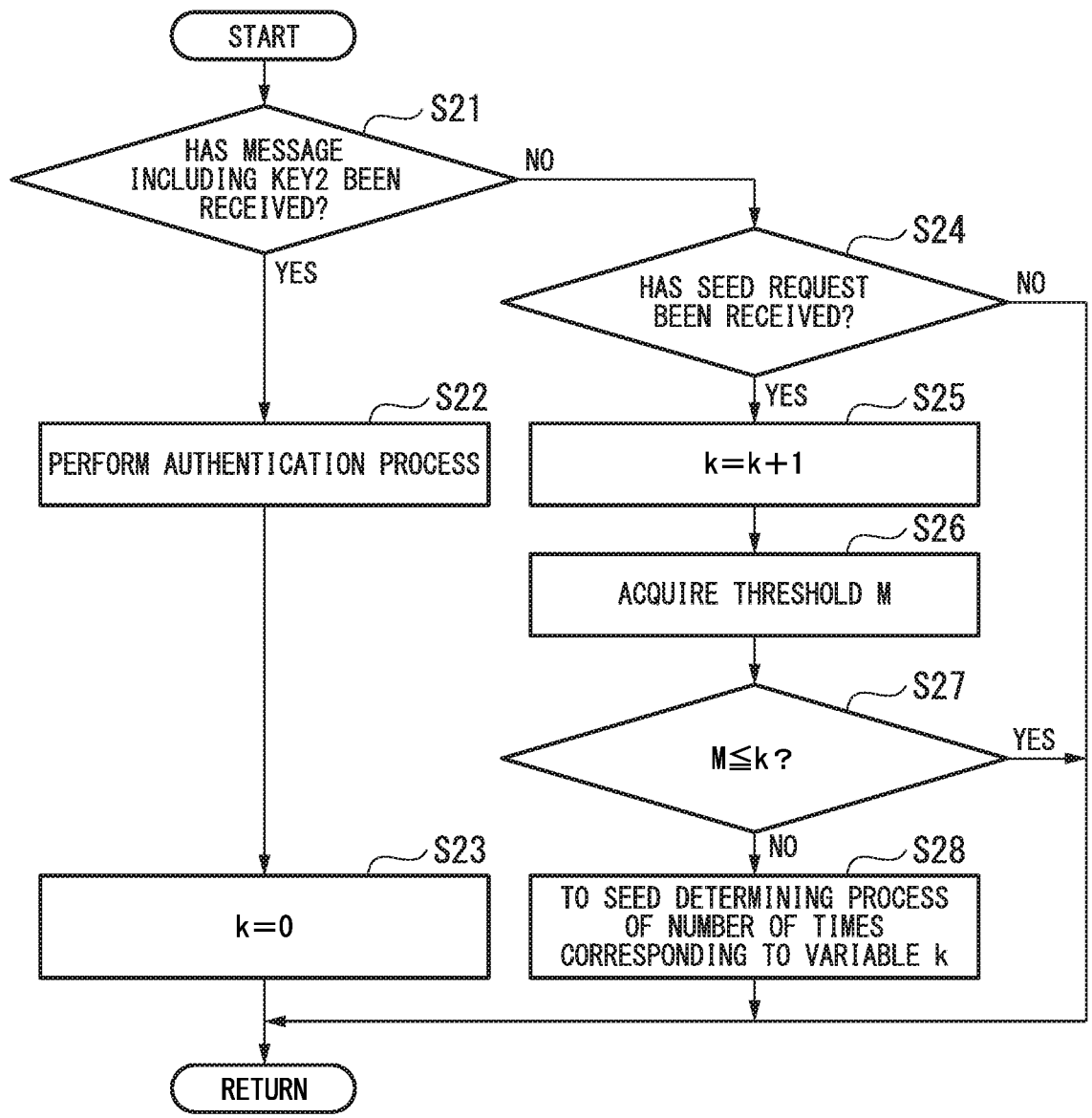
FIG. 8A is a flowchart illustrating the sequence of a process performed in a KEY waiting state according to this embodiment.

Thus, the ECU 10 according to this embodiment performs a process described below as part of the authentication process. FIG. 8A is a flowchart illustrating the sequence of a process performed in a KEY waiting state according to this embodiment.

The process illustrated below is performed according to the reception of messages such as a message including a key and a message including a k-th seed request until the completion of authentication after the reception of a first seed request. Here, k is a natural number of N or less.

First the control unit 11 determines whether or not a message including a KEY2 has been received (S21).

Next, when the message including the KEY2 has been received (S21: Yes), the control unit 11 initializes the code DB of the storage unit 12. Next, the control unit 11 performs an authentication process on the basis of the received KEY2 (S22) and gives a notification of a result thereof. The control unit 11 sets the value of a variable k representing the number of repetitions to "0" (S23) and transitions the control state to a waiting state ST0 to end the series of processes illustrated in the drawing.

On the other hand, when a message including the KEY2 has not been received (S21: No), the control unit 11 determines whether or not the received message includes a seed request (S24).

When the message including a seed request has been received (S24: Yes), the control unit 11 adds one to the value of the variable k representing the number of repetitions to update the variable k (S25). Next, the control unit 11 acquires a threshold M (S26) and determines whether or not the value of the variable k exceeds the threshold M (S27). Here, the threshold M is a natural number less than N. The threshold M according to this embodiment may be a predetermined value.

When the value of the variable k is less than the threshold M (S27: No), the control unit 11 performs a seed determining process of determining the value of a seed corresponding to seed requests of a number of times corresponding to the variable k (S28) and ends the series of processes illustrated in the drawing.

When a message including a seed request has not been received (S24: No), or when the value of the variable k is the threshold M or more (S27: Yes), the series of processes illustrated in the drawing ends, and waiting for a next message to be received is performed.

In the example described above, although a seed has been described as a value determined according to the number of times (k) of repetitions of the authentication process, a seed may be a random number that is randomly generated not on the basis of the number of repetitions of the authentication process.

Figure 9A:
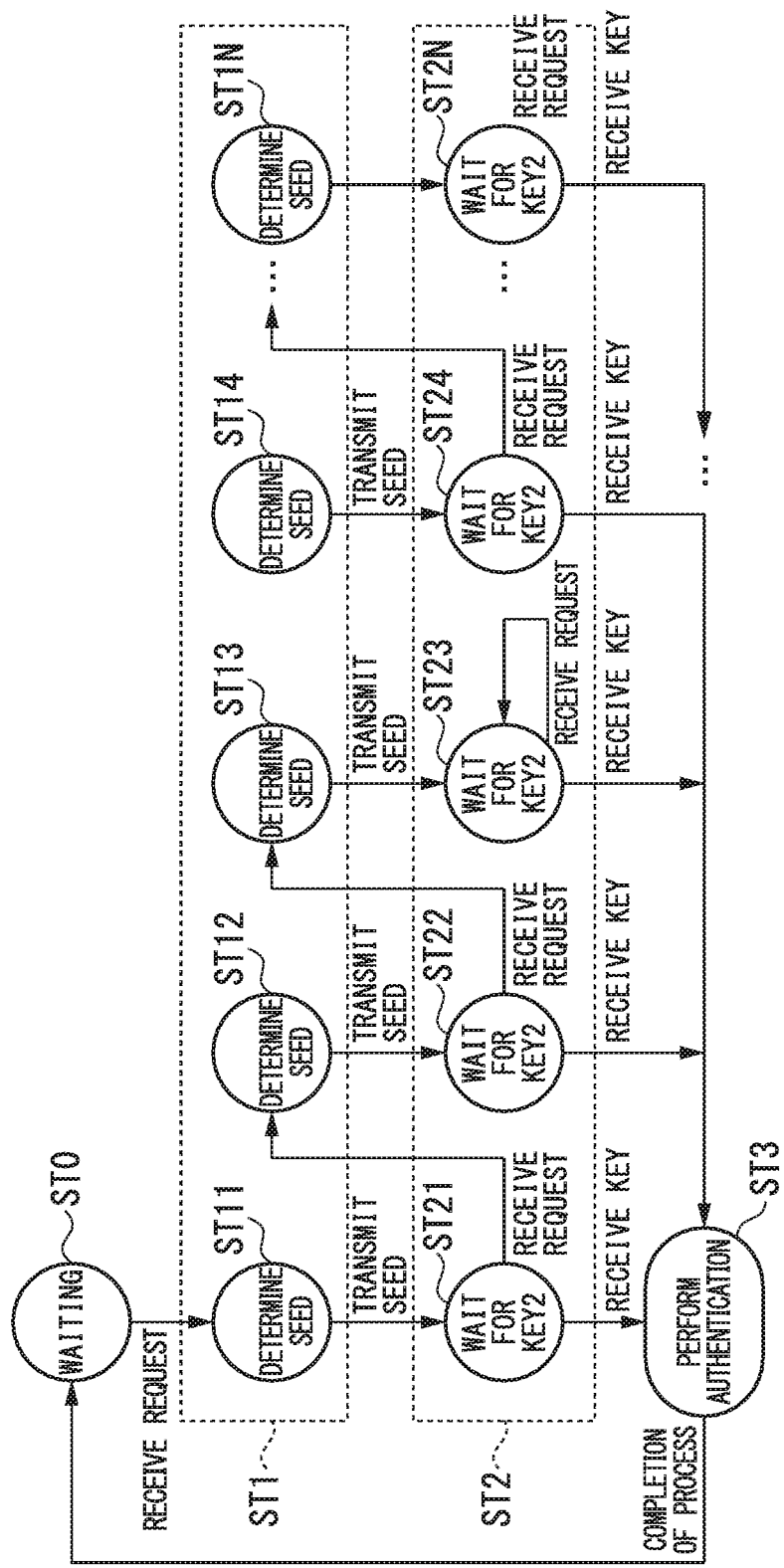
FIG. 9A is a state transition diagram of an authentication process performed by the ECU 10 according to this embodiment.

FIG. 9A is a state transition diagram of the authentication process performed by the ECU 10 according to this embodiment. Description will focus on different points from the example illustrated in FIG. 6. FIG. 9A illustrates a case in which the threshold M is set to "3" (a predetermined number of times).

For example, when a seed request is received twice without completing authentication after transmission of a seed in ST21, the process reaches at a seed determining process state of ST13. In ST13, by transmitting a seed, the control unit 11 transitions the control state to a KEY2 reception waiting state (ST23: KEY2 waiting).

Next, in ST23, by receiving a third seed request (request reception), the control unit 11 performs the process illustrated in FIG. 8A. As a result, according to a determination in S27 illustrated in FIG. 8A, the control unit 11 determines that the value (2+1) of the variable k is the value (3) of the threshold M or more (S27: Yes). In other words, while the control unit 11 ends the series of processes illustrated in FIG. 8A, the control state does not change from ST23. In other words, the control unit 11 performs a fail-safe process in which, when the request is repeatedly received as described above, a seed is not transmitted.

According to the embodiment described above, the ECU 10 transmits a seed (challenge code) on the basis of a received seed request (request signal). The ECU 10 performs authentication of an authentication target apparatus such as the external apparatus 50 transmitting a seed request on the basis of the seed and a KEY2 (response code) generated on the basis of the seed. When a seed request is received from the authentication target apparatus a set number of times or more before the completion of the authentication for a transmitted seed after the transmission of the seed, and the control unit 11 of the ECU 10 performs a predetermined fail-safe process to suppress clearing of an illegitimate authentication process, whereby the reliability of authentication through communication can be further improved.

In addition, when "before the completion of the authentication" is a time point before the reception of the KEY2, and even if an illegitimate apparatus performs a behavior of repeatedly transmitting only a seed request without transmitting a KEY2 to avoid a determination of authentication incompatibility, the ECU 10 can handle such a case. In other words, when a seed request is received a set number of times (threshold) from the authentication target apparatus before the reception of a KEY2, the ECU 10 performs a predetermined fail-safe process, whereby a countermeasure for a seed request that is illegitimately repeatedly transmitted can be taken.

In addition, the control unit 11 of this embodiment performs a process (challenge code transmission prohibiting process) of limiting the transmission of a seed in which a seed for a seed request received from an authentication target apparatus is not transmitted as the predetermined fail-safe process described above.

Modified Example of First Embodiment

Next, a modified example of the first embodiment will be described. In the first embodiment, a case has been described in which a period for determining whether or not the fail-safe process is to be performed is after the transmission of a seed, and "before the completion of authentication" for the transmitted seed is before a time point before the reception of a KEY2. In contrast to this, in this modified example, a case will be described in which "before the authentication" is before a time point at which it is determined whether or not an authentication target apparatus is an authorized apparatus through a determination of whether a KEY1 corresponding to the seed and the received KEY2 match each other. Description will focus on different points from the first embodiment.

Figure 9B:
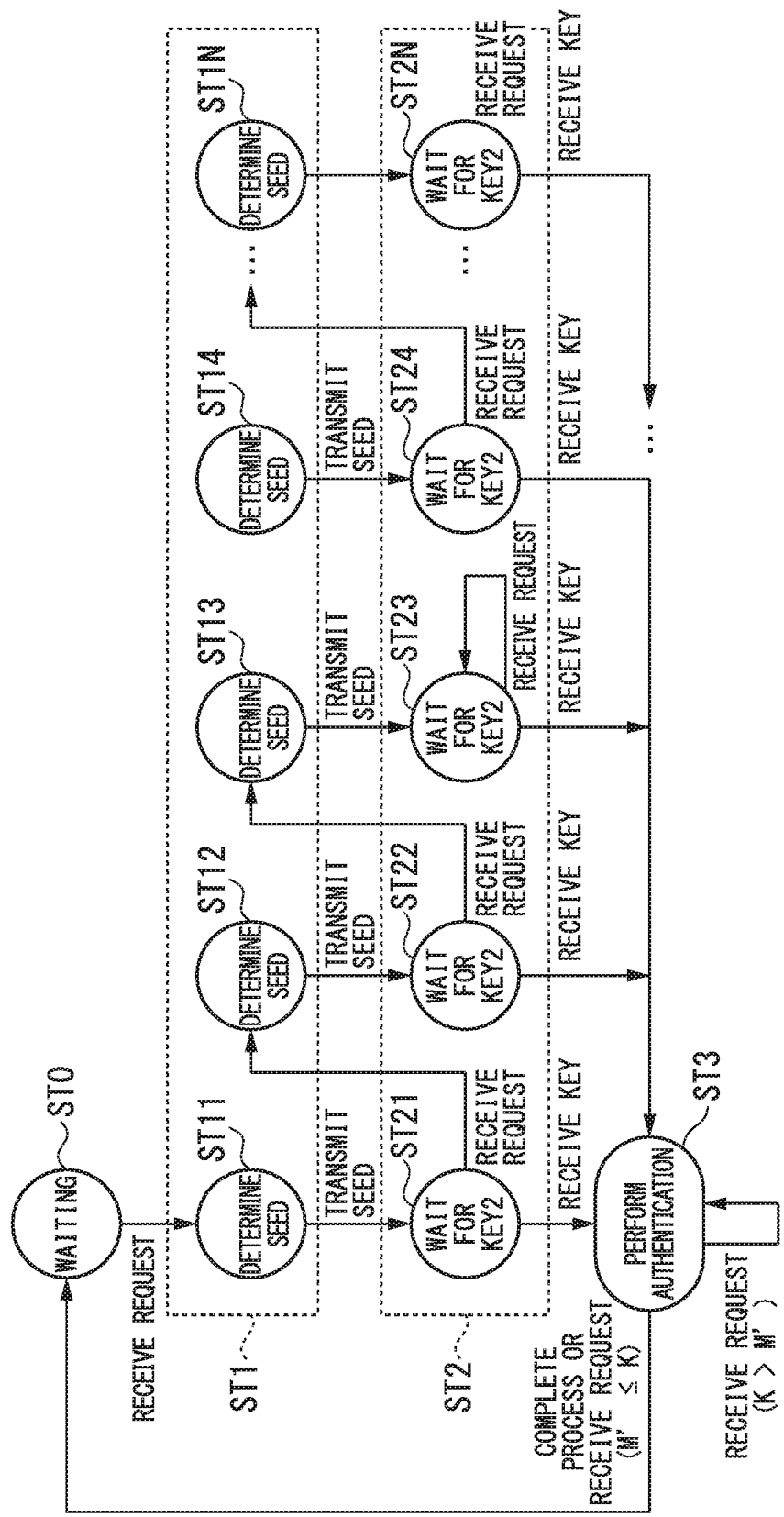
FIG. 9B is a state transition diagram of an authentication process performed by an ECU 10 according to a modified example of this embodiment.

FIG. 9B is a state transition diagram of an authentication process performed by an ECU 10 according to this modified example. Description will focus on different points from the case illustrated in FIG. 9A. In FIG. 9B, a transition of a case in which a further request process is received "before the authentication" in ST3 after the transition to ST3 is added to the state transition diagram illustrated in FIG. 9A described above.

When a seed request is received (request reception) "before the authentication" in ST3, in other words, before a time point at which it is determined whether or not an authentication target apparatus is an authorized apparatus through a determination of whether the KEY1 corresponding to the seed and the received KEY2 match each other, the ECU 10 counts the number of times (k) the seed request is received. When the number of times (k) the seed request is received is less than a predetermined number of times (M'), the ECU 10 continues to perform the authentication process without transitioning the state. On the other hand, when the number of times (k) the seed request is received is the predetermined number of times (M') or more, the ECU 10 stops the authentication process and transitions the state to the waiting state (ST0). Here, the value of the threshold M' set as the predetermined number of times may be the same as or different from the value of the threshold M described above.

Figure 8B:
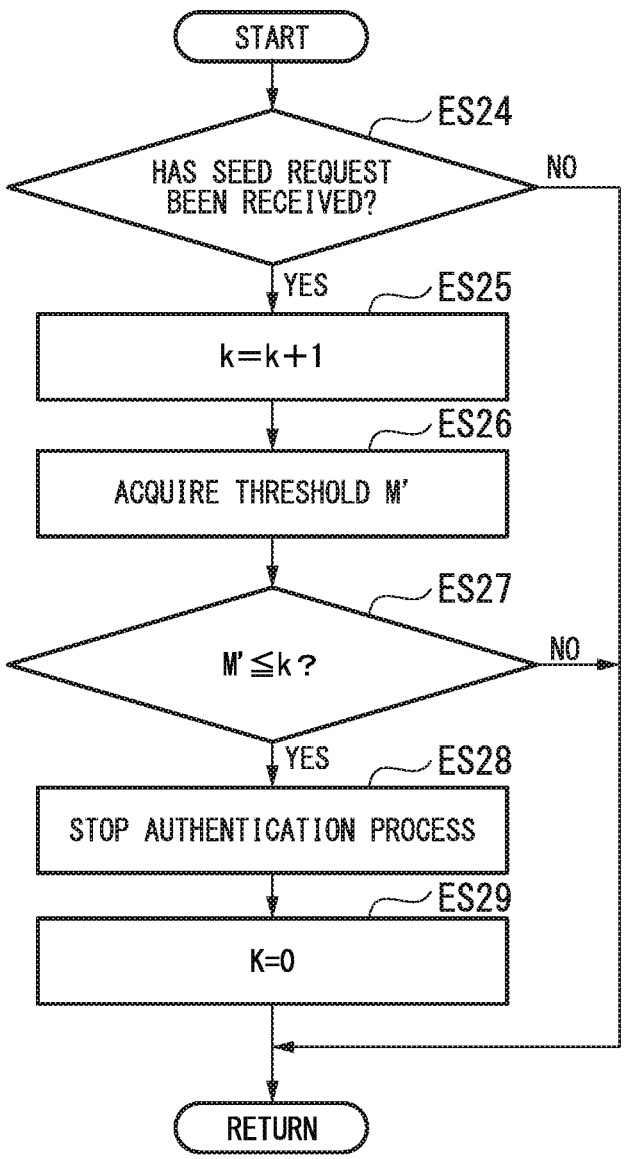
FIG. 8B is a flowchart illustrating the sequence of a process added to the process performed in the KEY waiting state according to a modified example of this embodiment.

An example of the process for realizing the state transitions described above will be described. The ECU 10 performs a process illustrated in FIG. 8B in addition to the process in the KEY waiting state illustrated in FIG. 8A described above. FIG. 8B is a flowchart illustrating the sequence of a process added to the process performed in the KEY waiting state according to a modified example of this embodiment. The control unit 11 determines that a message including the KEY2 has been received (S21: Yes) through a determination of S21 illustrated in FIG. 8A, performs an authentication process on the basis of the received KEY2, and performs the process illustrated in FIG. 8B as an interrupt process (S22).

The process of ES24 to ES26 illustrated in FIG. 8B corresponds to the process of S24 to S26 illustrated in FIG. 8A. Here, the threshold M represented in S26 is replaced with the threshold M'. In other words, the control unit 11 detects the reception of a seed request in parallel during the execution of the authentication process of S22, and according to the detection of the reception, performs a process described below on the basis of the number of detections.

In the determination of ES27, when the value of the variable k is the threshold M' or more (ES27: Yes), the control unit 11 performs a fail-safe process and stops the authentication process (ES28). The control unit 11 sets the value of the variable k representing the number of repetitions to "0" (S23) and transitions the control state to the waiting state ST0.

In the determination of ES27, when the value of the variable k is less than the threshold M' (ES27: No), the control unit 11 continues the authentication process as it is.

According to this modified example, the period of "before the authentication" is a period before the time point at which it is determined whether or not an authentication target apparatus is an authorized apparatus through a determination of whether the KEY1 corresponding to the seed and the received KEY2 match each other and includes a period until the authentication process is completed. In addition, the period of "before the authentication" also includes a period before the reception of the KEY2. For example, when a seed request is received a greater number of times than the set number of times from an authentication target apparatus in a period before the completion of the authentication including the period before the reception of the KEY2, the control unit 11 performs a predetermined fail-safe process to suppress the illegitimate acquisition of authentication and accordingly can take a countermeasure for a seed request that is illegitimately repeatedly transmitted, whereby the reliability of the authentication through communication can be further improved.

Second Embodiment

Next, a second embodiment of the present invention will be described. In the first embodiment, a case has been described in which a seed is not transmitted in a case where a request is repeatedly received a number of times exceeding the predetermined number of times. Instead of this, in this embodiment, a first case will be described in which a seed transmitted before the execution of the fail-safe process is transmitted.

Figure 10:
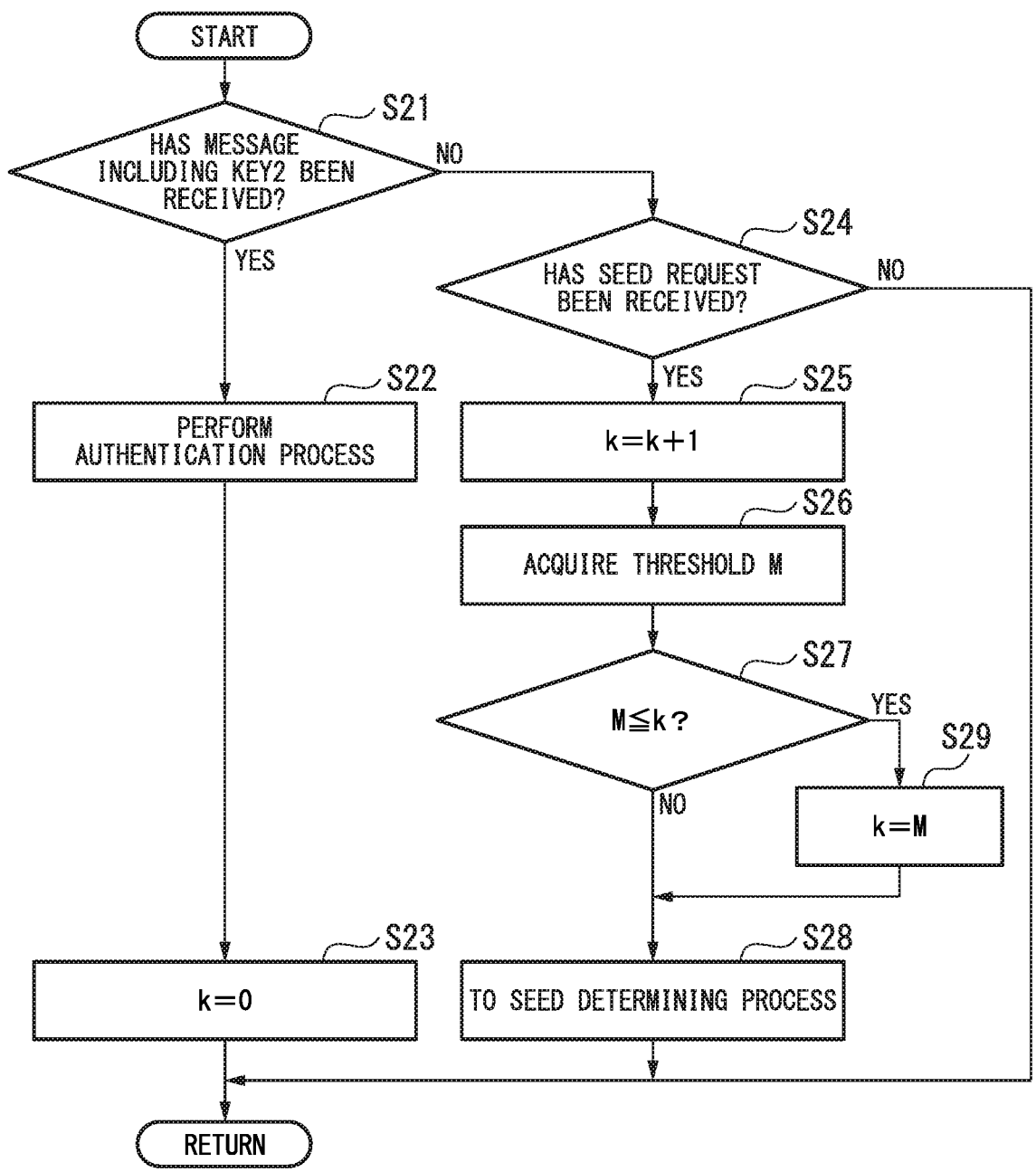
FIG. 10 is a flowchart illustrating the sequence of a process performed in a second KEY waiting state.

FIG. 10 is a flowchart illustrating the sequence of a process performed in a KEY waiting state. Different points from the case illustrated in FIG. 8A will be focused on in description. For S21 to S27, the description of FIG. 8A presented above will be referred to.

In a case where the value of the variable k is the threshold M or more (S27: Yes), the control unit 11 sets the value of the variable k to M (S29). The control unit 11 performs a seed determining process on the basis of the value (M) of the variable k set in S29, in other words, such that the value of a seed for a seed request after the M-th time is the value of a seed for the seed request of the M-th time (S28) and ends a series of processes illustrated in the drawing.

In a case where a message including a seed request has not been received (S24: No), the series of processes illustrated in the drawing is ended and waiting for a next message to be received is performed.

Figure 11:
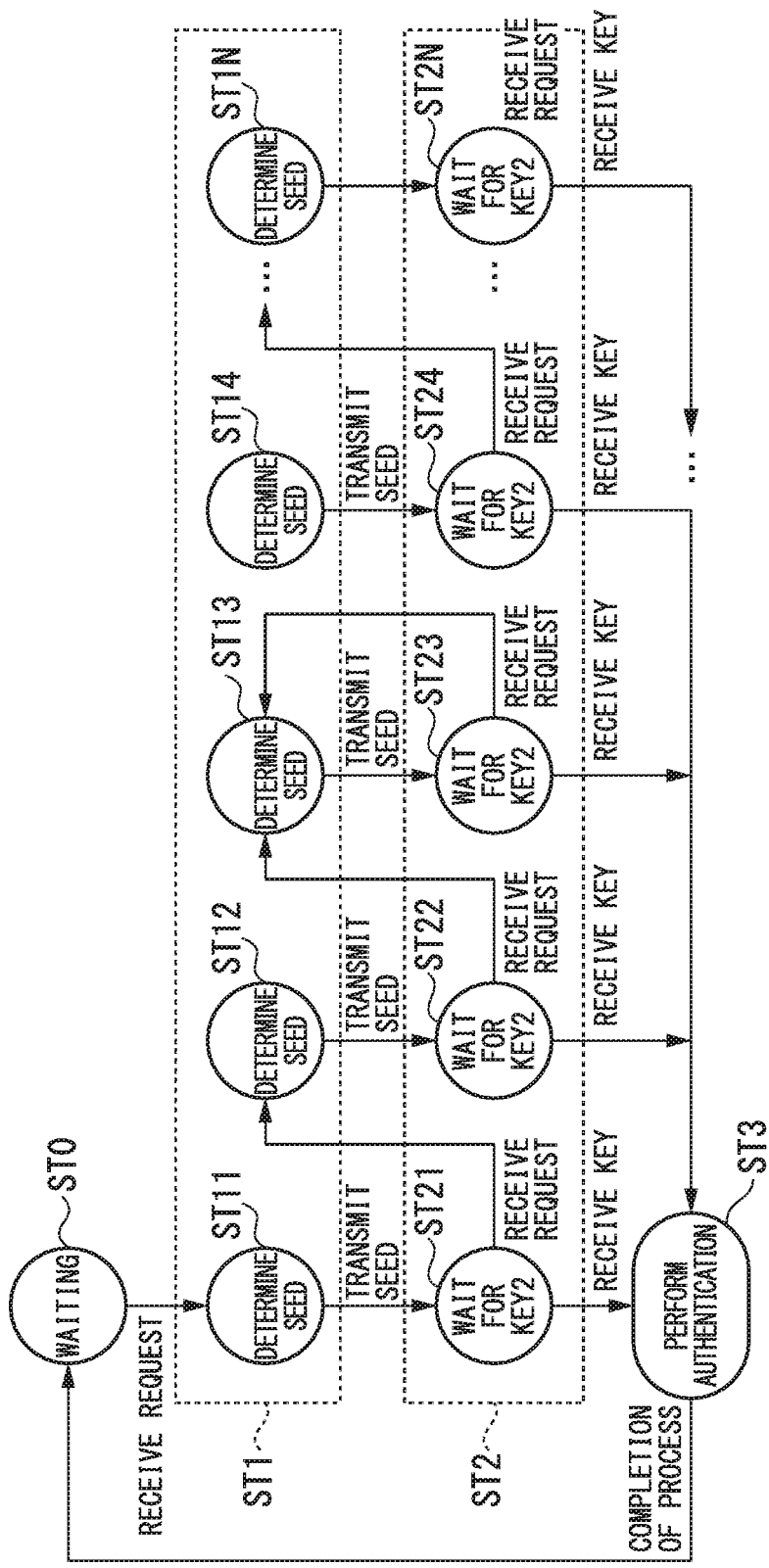
FIG. 11 is a state transition diagram of an authentication process performed by the ECU 10 according to this embodiment.

FIG. 11 is a state transition diagram of an authentication process performed by the ECU 10 according to this embodiment. Different points from the case illustrated in FIG. 6 will be focused on in description. FIG. 11 illustrates a case where the threshold M is three (a predetermined number of times).

For example, in ST21, when a seed request is received twice without completing authentication after the transmission of a seed, the state is transitioned to a seed determination process state of ST13. In the case of being in ST13, by transmitting a seed, the control unit 11 transitions the control state to a KEY2 reception waiting state (ST23: KEY2 waiting).

Next, in ST23, by receiving (request reception) a seed request, the control unit 11 performs a process illustrated in FIG. 10. The seed request described above is a third seed request when counting after the transmission of the seed in ST21. As a result, according to a determination of S27 illustrated in FIG. 10, the control unit 11 determines that the value (2+1) of the variable k is the value (3) of the threshold M or more (S27: Yes). In other words, in a process according to the previous seed request, on the basis of the value of the variable k set in S29 illustrated in FIG. 10, the control unit 11 transitions the control state to the seed determination process state ST13 and transmits the value of a seed according to the third (M-th) seed request. Thereafter, until a condition for a transition to ST31 is satisfied, the control unit 11 transitions the control state according to a result of the same determination described above between ST13 and ST23. Thereafter, even when a seed request is received, the control unit 11 transmits the same value as the value of the seed transmitted in the state ST13 as the value of the seed.

In other words, in a case where a seed request is repeatedly received as described above, the control unit 11 performs a fail-safe process of transmitting a seed selected from among the seeds that have already been transmitted.

According to the embodiment described above, in addition to the effects similar to those of the first embodiment, by performing a predetermined fail-safe process, the control unit 11 limits transmission of a new value of the seed by setting the value of the seed determined by the code generating unit 14 to the value of a seed that has been transmitted until the predetermined fail-safe process is performed, whereby the reliability of authentication through communication can be further improved.

In addition, by setting the same value as the value of the seed that has been transmitted before the execution of the fail-safe process as the value of the seed, the control unit 11 limits the transmission of a value different from the values of the seeds that have been transmitted before, whereby the reliability of authentication through communication can be further improved.

Third Embodiment

Next, a third embodiment will be described. In the first embodiment, while the case where a seed is not transmitted in a case where a request is received repeatedly over a predetermined number of times, instead of this, in this embodiment, a second case will be described in which a seed that has been transmitted before the execution of the fail-safe process is transmitted.

Figure 12:
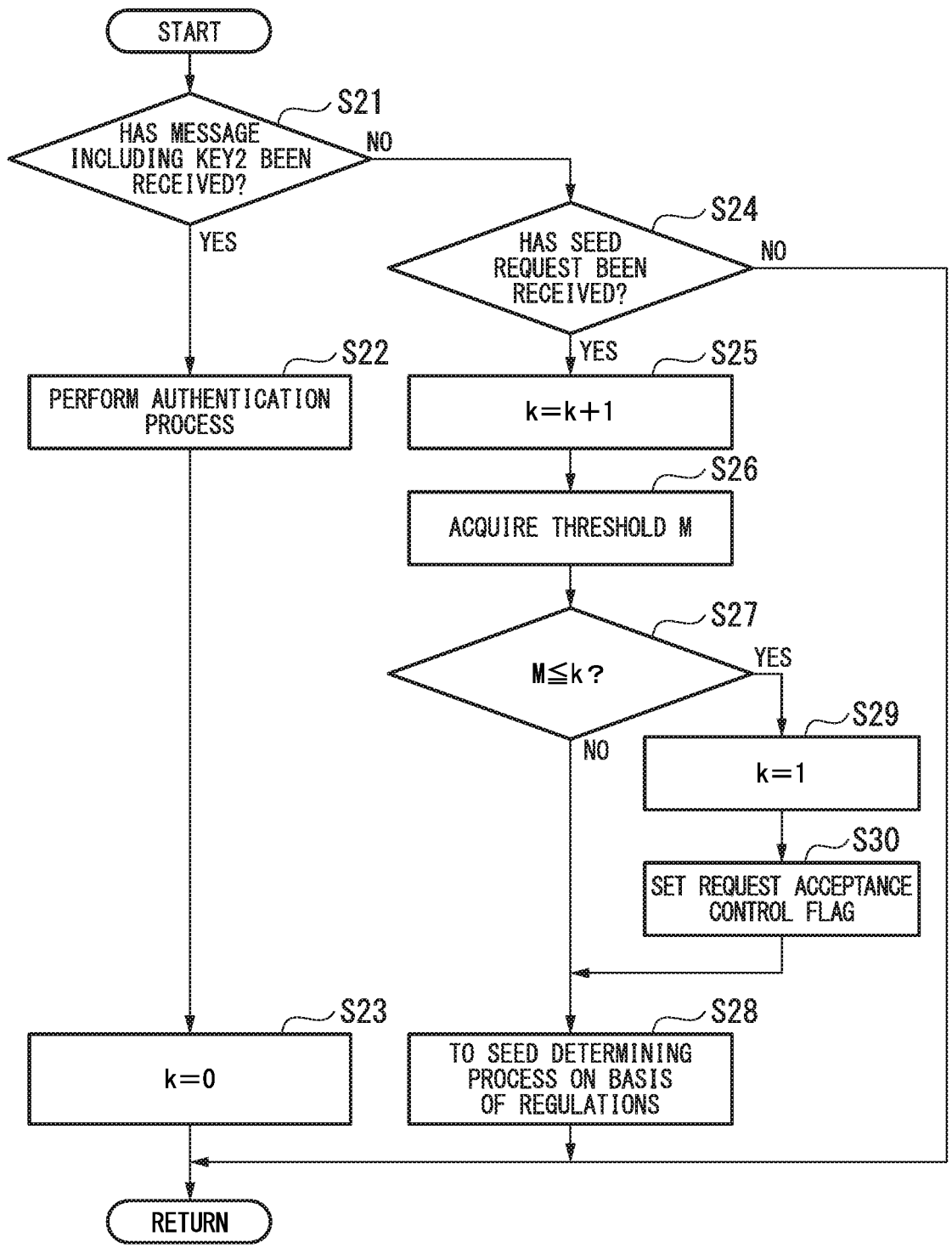
FIG. 12 is a flowchart illustrating the sequence of a process performed in a KEY waiting state of a second case according to a third embodiment.

FIG. 12 is a flowchart illustrating the sequence of a process performed in a KEY waiting state in this embodiment. Different points from the case illustrated in FIG. 8A will be focused on in description. For S21 to S27, the description of FIG. 8A presented above will be referred to.

According to a determination (S27) on whether or not the value of the variable k is the threshold M or more, in a case where the value of the variable k is the threshold M or more (S27: Yes), the control unit 11 sets the value of the variable k to "1" (S29) and sets a request acceptance limit flag (S30). In a case where the request acceptance limit flag is set, it represents a state in which the acceptance of a seed request is limited.

In a case where the value of the variable k is less than the threshold M (S27: No), or after the process of Step S30 ends, the control unit 11 performs a seed determining process on the basis of regulations (S28) and ends the series of processes illustrated in the drawing.

On the other hand, after the transmission of a seed, in a case where the value of the variable k is the threshold M or less, the request acceptance limit flag is in a cleared state. In this case, in the seed determining process on the basis of the regulations, the control unit 11 performs a process described below. In this case, the control unit 11 determines the value of a seed according to a seed request of a number of times corresponding to the variable k by controlling the code generating unit 14.

On the other hand, after the transmission of the seed, in a case where the value of the variable k becomes the threshold M or more once, the request acceptance limit flag is in the set state. In this case, in the seed determining process on the basis of the regulations described above, the control unit 11 performs a process described below. In this case, the control unit 11 determines the value of a seed to be transmitted this time based on the values of the seeds transmitted in the past by referring to the code DB of the storage unit 12. For example, the control unit 11 selects the value of the seed generated at the number of times corresponding to the value of the variable k as the value of the seed to be transmitted.

In a case where a seed request has not been received (S24: No), the series of processes illustrated in the drawing ends, and waiting for a next message to be received is performed.

In addition, in this embodiment, the control unit 11 performs a process of clearing the request acceptance limit flag in a stage in which the process of S23 ends.

Figure 13:
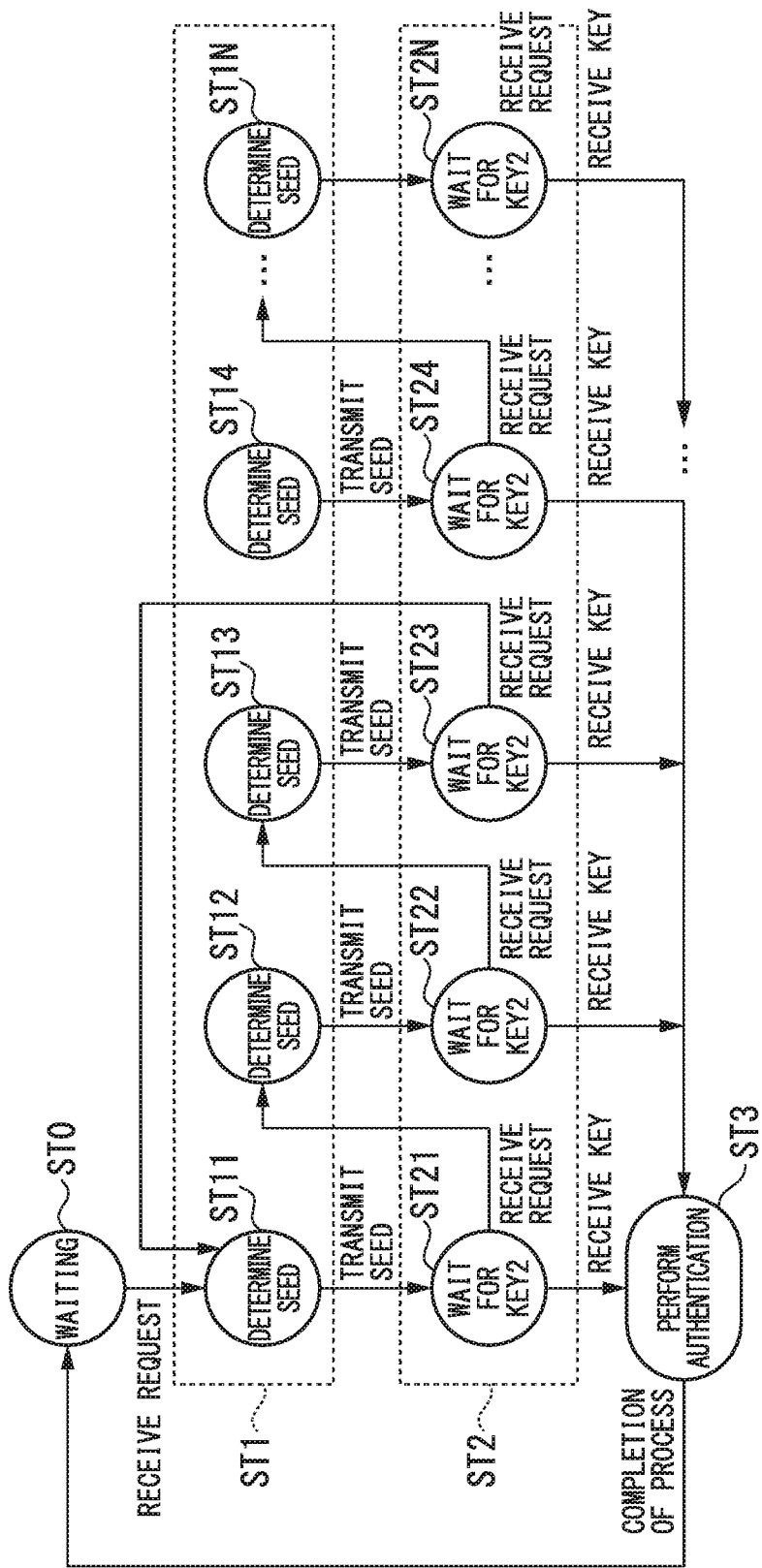
FIG. 13 is a state transition diagram of an authentication process performed by an ECU 10 according to this embodiment.

FIG. 13 is a state transition diagram of an authentication process performed by the ECU 10 according to this embodiment. Different points from the case illustrated in FIG. 6 will be focused on in description. FIG. 13 illustrates a case where the threshold M is set to "3" (a predetermined number of times).

For example, in a case where a seed request is received twice without completion of authentication after the transmission of a seed in ST21, the state reaches at the seed determination process state of ST13. In ST13, by transmitting a seed, the control unit 11 transitions the control state to a KEY2 reception waiting state (ST23: KEY2 waiting).

Next, in ST23, by receiving (request reception) a third seed request, the control unit 11 performs a process illustrated in FIG. 12. As a result, according to a determination of S27 illustrated in FIG. 12, the control unit 11 determines that the value (2+1) of the variable k is the value (3) of the threshold M or more (S27: Yes). In other words, on the basis of the value (k=1) of the variable k set in S29 illustrated in FIG. 12, the control unit 11 transitions the control state to the seed determination process state ST11 and transmits the same value of the seed as the value of the seed transmitted according to the first seed request. Thereafter, similar to the case illustrated in FIG. 6, the control unit 11 transitions the control state. In the process, the control unit 11 re-transmits the values of the seeds transmitted in the states of ST11, ST12, and ST13 as the values of the seeds of the states.

In other words, in a case where a request is repeatedly received as described above, the control unit 11 performs a fail-safe process of transmitting a seed selected from among seeds that have already been transmitted.

According to the embodiment described above, effects common to the first embodiment and the second embodiment are acquired.

Fourth Embodiment

Next, a fourth embodiment will be described. In the first to third embodiments, although the cases in which the number of times of repeatedly receiving a seed request is fixed have been described, instead of this, in this embodiment, a case in which the number of times of repeatedly receiving a seed request is adjusted according to the state will be described.

As illustrated in FIG. 2B described above, the communication control unit 13 detects the amount of communication performed through the bus 2 by using the communication interface 10F.

The control unit 11 acquires the amount of communication performed through the bus 2 from the communication control unit 13. The amount of communication, for example, is some or all of the number of packets per unit time, the number of frames, the amount of data, the occupancy rate of the bus 2, and the like. The control unit 11 adjusts a threshold M on the basis of the amount of communication acquired from the communication control unit 13.

In packet communication using the bus 2, the amount of communication depends on the number of packets per unit time, the size of the packets, and the like. When the amount of communication increases, a ratio of a time (bus occupancy time) required for the transmission of packets to a total time increases. When the amount of communication exceeds a predetermined value, congestion occurs, and a situation in which a packet cannot be necessarily transmitted at a requested timing occurs. According to such a situation described above, a time relating to the sequence up to the establishment of communication between two apparatuses is delayed, or packets discarded due to time-over up to a transmission time are generated.

Thus, in a case where the amount of communication per unit time is larger than a predetermined value in a bus 2 (communication line) communicating with an external apparatus 50 (authentication target apparatus), a control unit 11 according to this embodiment sets the value of the number of times (a set number of times) of repeatedly receiving a seed request to a value larger than that of a case where the amount of communication is less than the predetermined value.

Figure 14:
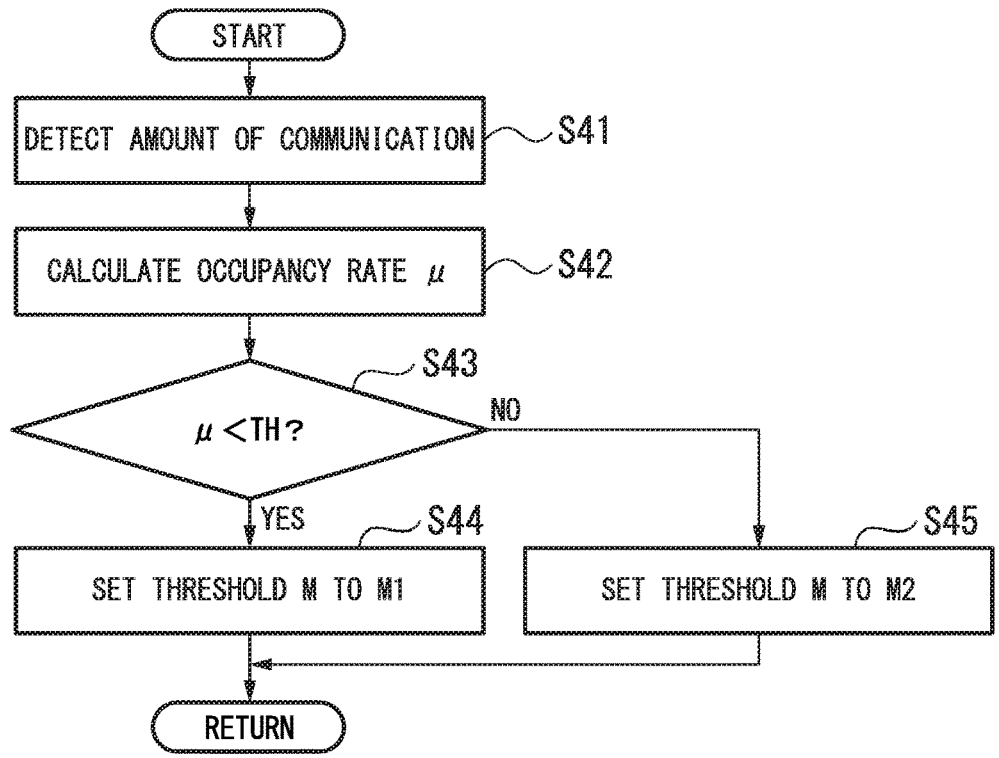
FIG. 14 is a flowchart illustrating the sequence of an adjustment process of a threshold M according to a fourth embodiment.

FIG. 14 is a flowchart illustrating the sequence of adjusting the threshold M according to this embodiment.

For example, the amount of communication is represented as a ratio of an occupancy time of packet communication in the bus 2 to a total time, an occupancy rate of a state in which communication is not performed is 0%, and an occupancy rate of a state in which the bus 2 is occupied, which does not actually occur, is 100%.

For example, the communication control unit 13 detects the amount of communication performed through the bus 2 by using the communication interface 10F (S41). The control unit 11 calculates an occupancy rate p representing the amount of communication on the basis of the detected amount of communication (S42). The control unit 11 determines whether or not the occupancy rate p is a threshold TH (for example, 50%) or more (S43). In a case where the occupancy rate representing the amount of communication is less than the threshold TH (S43: Yes), the value of the threshold value M is determined to be M1 (S44). For example, M is set to "3".

In a case where the occupancy rate representing the amount of communication is the threshold TH or more (S43: No), the value of the threshold M is set to M2 (S45). For example, M2 is 10. Here, M1 is smaller than M2.

According to the embodiment described above, the effects similar to those of the first embodiment are acquired, and the control unit 11 changes the value of the number of times (a set number of times) a seed request is repeatedly received in accordance with the communication state. For example, in a communication line (bus 2) communicating with an external apparatus 50 (authentication target apparatus), in a case where the amount of communication per unit time is larger than a predetermined value, by setting the value of the number of times of repeatedly receiving a seed request to a value larger than that of a case where the amount of communication is smaller than the predetermined value, the control unit 11 can perform an optimal authentication process according to the amount of communication.

Fifth Embodiment

Next, a fifth embodiment will be described. In the first to fourth embodiments, although a case of wired communication using the bus 2 as a communication line has been described, instead of this, in this embodiment, a case of radio communication will be described. Different points from the embodiments described above will be focused in description.

The communication system 1 illustrated in FIG. 1, for example, is mounted in a vehicle and forms a network NW having an area in which radio communication can be performed inside the vehicle. For example, the communication system is IEEE 802.11, Bluetooth (registered trademark), or the like.

ECUs included in the communication system 1 include an ECU 10-1 that has at least a radio communication interface 10D and enables radio communication. The ECU 10-1 enabling radio communication may be further connected to a common bus 2 together with the other ECUs 10.

A terminal apparatus 60 is a mobile terminal such as a smartphone. The terminal apparatus 60 includes a computer and realizes a radio communication function for communicating with the ECU 10-1 by causing the computer to execute a program such as application software, or OS. When a malicious program or the like is executed, there are cases where the terminal apparatus 60 transmits a seed request using an illegitimate communication sequence.

Regarding this, the ECU 10-1 may be configured to perform a predetermined fail-safe process for a seed request transmitted using an illegitimate communication sequence by using the techniques illustrated in the first to fourth embodiments described above.

In addition, instead of this, the ECU 10-1 may perform a predetermined fail-safe process by combining processes described below.

For example, the communication control unit 13 of the ECU 10-1 detects a reception signal intensity by using the radio communication interface 10D.

The control unit 11 acquires the detected reception signal intensity from the communication control unit 13. The control unit 11 adjusts the threshold M on the basis of the reception signal intensity acquired from the communication control unit 13.

In the radio communication, when the reception signal intensity decreases, a probability that a packet cannot be normally received according to the influence of interferences, multiple paths, noises, and the like increases. In other words, when the reception signal intensity decreases, a probability that retransmission is necessary increases.

Thus, in a case where the detected reception signal intensity detected using the radio communication interface 10D is weaker than a predetermined value, the control unit 11 according to this embodiment adjusts the value of the number of times (a set number of times) of repeatedly receiving a seed request to a value larger than that of a case where the reception signal intensity is stronger than the predetermined value.

Figure 15:
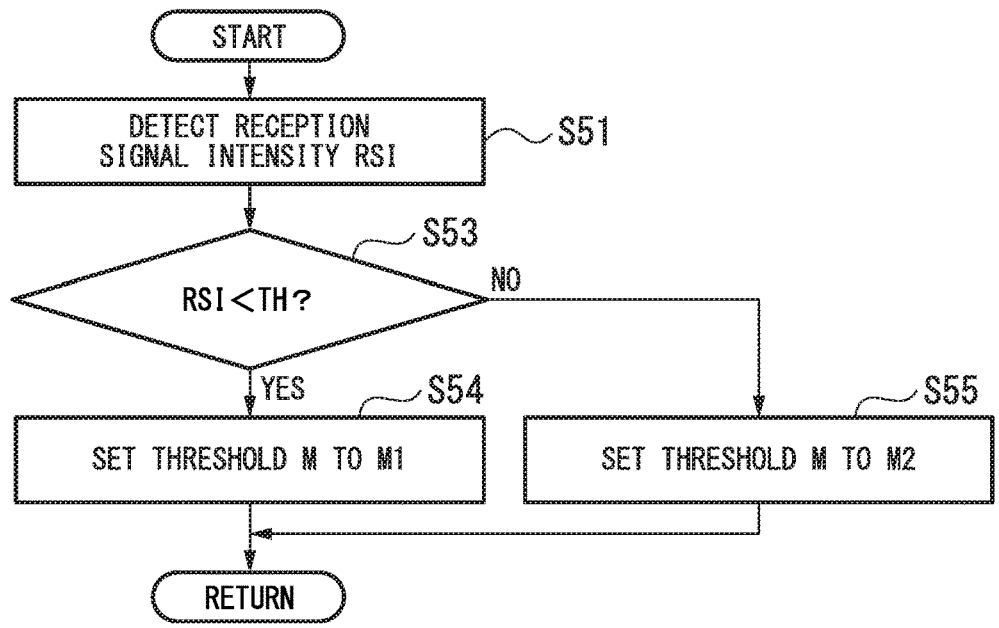
FIG. 15 is a flowchart illustrating the sequence of adjusting a threshold M according to a fifth embodiment.

FIG. 15 is a flowchart illustrating the sequence of adjusting the threshold M according to this embodiment.

For example, the communication control unit 13 detects a reception signal intensity RSI by using the radio communication interface 10D (S51). The control unit 11 determines whether or not the reception signal intensity RSI is a threshold TH (for example, 50%) or more (S53). In a case where the reception signal intensity RSI is less than the threshold TH (S53: Yes), the control unit 11 determines the value of the threshold M to be M1 (S54). For example, M1 is 3.

In a case where the reception signal intensity RSI representing the amount of communication is the threshold TH or more (S53: No), the control unit 11 sets the value of the threshold M to M2 (S55). For example, M2 is 10. Here, the value of M2 is larger than the value of M1.

According to the embodiment described above, effects similar to those of the first embodiment are acquired, and the control unit 11 changes the value of the number of times (the set number of times) of repeatedly receiving a seed request in accordance with the communication state. For example, in a case where the reception signal intensity RSI of radio communication is weaker than the threshold TH, by setting the value M1 of the number of times of repeatedly receiving a seed request to a value M2 larger than that of a case where the reception signal intensity RSI is stronger than the threshold TH, the control unit 11 can perform an optimal authentication process according to the communication state (radio communication intensity).

According to at least one embodiment described above, the ECU 10 transmits a challenge code on the basis of a received request signal and performs authentication of an authentication target apparatus transmitting a request signal on the basis of the challenge code and a response code generated on the basis of the challenge code. After transmission of the challenge code, in a case where a request signal is received the set number of times of more from the authentication target apparatus before the authentication, the control unit 11 of the ECU 10 performs a predetermined fail-safe process. Accordingly, in a case where a command requesting only a challenge code is repeatedly received, the ECU 10 may determine an attack from the other apparatus or the like. In addition, in a case where such a determination is performed, the ECU 10, for a request for a challenge code described above, performs a fail-safe process such as (1) not responding according to the determined sequence (2) no response (not transmitting a seed), or (3) making a response different from an authentic sequence.

While the forms for performing the present invention have been described using the embodiments, the present invention is not limited to such embodiments, but various modifications and substitutions may be applied within a range not departing from the concept of the present invention.

For example, technologies represented in the embodiments described above may be appropriately combined.

What is claimed is:

1. A communication apparatus that transmits a challenge code on the basis of a received request signal and performs authentication of an authentication target apparatus transmitting the request signal on the basis of a response code generated on the basis of the challenge code, the communication apparatus comprising:
a hardware processor configured to perform a predetermined fail-safe process when a request signal is received a set number of times or more from the authentication target apparatus after the transmission of the challenge code before a time point at which it is determined whether or not the authentication target apparatus is an authorized apparatus through a determination of whether a first response code corresponding to the challenge code and a received second response code match each other, the predetermined fail-safe process being a challenge code transmission prohibiting process of not transmitting the challenge code for the request signal received from the authentication target apparatus;
wherein the hardware processor changes a value of the set number of times in accordance with a communication state.

2. The communication apparatus according to claim 1, wherein the hardware processor, by performing the predetermined fail-safe process, sets a value of the challenge code to a value of a challenge code transmitted before the predetermined fail-safe process is performed.

3. The communication apparatus according to claim 1, wherein the hardware processor sets the same value as a value of a challenge code transmitted immediately before the predetermined fail-safe process is performed as a value of the challenge code.

4. The communication apparatus according to claim 1, further comprising: a radio communication unit configured to perform radio communication with the authentication target apparatus, wherein, when a reception signal intensity of the radio communication is weaker than a predetermined value, the hardware processor sets a value of the set number of times to a value larger than a value of a case in which the reception signal intensity is stronger than the predetermined value.

5. The communication apparatus according to claim 1, wherein, in a communication line communicating with the authentication target apparatus, when an amount of communication per unit time is larger than a predetermined value, the hardware processor sets the value of the set number of times to a value larger than a value of a case in which the amount of communication is less than the predetermined value.

6. A communication system comprising: a first communication apparatus according to claim 1; and a second communication apparatus configured to transmit a request signal, receive a challenge code after the transmission of the request signal, generate a response code on the basis of the challenge code, and transmit the generated response code to the first communication apparatus.

7. A communication method using a communication apparatus that transmits a challenge code on the basis of a received request signal and performs authentication of an authentication target apparatus transmitting the request signal on the basis of a response code generated on the basis of the challenge code, the communication method comprising:
counting a number of times a request signal is received from the authentication target apparatus after the transmission of the challenge code before a time point at which it is determined whether or not the authentication target apparatus is an authorized apparatus through a determination of whether a first response code corresponding to the challenge code and a received second response code match each other; and
performing a predetermined fail-safe process when the number of times the request signal is received is a set number of times or more based on a result of the counting, the predetermined fail-safe process being a challenge code transmission prohibiting process of not transmitting the challenge code for the request signal received from the authentication target apparatus;
wherein a value of the set number of times is changed in accordance with a communication state.

8. A computer-readable non-transitory storage medium storing a program causing a computer of a communication apparatus that transmits a challenge code on the basis of a received request signal and performs authentication of an authentication target apparatus transmitting the request signal on the basis of a response code generated on the basis of the challenge code to execute:
counting a number of times a request signal is received from the authentication target apparatus after the transmission of the challenge code before a time point at which it is determined whether or not the authentication target apparatus is an authorized apparatus through a determination of whether a first response code corresponding to the challenge code and a received second response code match each other; and
performing a predetermined fail-safe process when the number of times the request signal is received is a set number of times or more based on a result of the counting, the predetermined fail-safe process being a challenge code transmission prohibiting process of not transmitting the challenge code for the request signal received from the authentication target apparatus;
wherein a value of the set number of times is changed in accordance with a communication state.

9. A communication apparatus that transmits a challenge code on the basis of a received request signal and performs authentication of an authentication target apparatus transmitting the request signal on the basis of a response code generated on the basis of the challenge code, the communication apparatus comprising:
- a hardware processor configured to perform a predetermined fail-safe process when a request signal is received a set number of times or more from the authentication target apparatus after the transmission of the challenge code before reception of the response code, the predetermined fail-safe process being a challenge code transmission prohibiting process of not transmitting the challenge code for the request signal received from the authentication target apparatus;
- wherein a value of the set number of times is changed in accordance with a communication state.

* * * * *